US009151000B2

(12) United States Patent
Rowell

(10) Patent No.: US 9,151,000 B2
(45) Date of Patent: Oct. 6, 2015

(54) TREATMENT OF WOOD PIECES

(75) Inventor: Roger M. Rowell, Madison, WI (US)

(73) Assignee: Titan Wood Limited (GB)

(*) Notice: Subject to any disclaimer, the term of this patent is extended or adjusted under 35 U.S.C. 154(b) by 0 days.

(21) Appl. No.: 13/822,940

(22) PCT Filed: Sep. 16, 2011

(86) PCT No.: PCT/US2011/051971
§ 371 (c)(1),
(2), (4) Date: Apr. 12, 2013

(87) PCT Pub. No.: WO2012/037481
PCT Pub. Date: Mar. 22, 2012

(65) Prior Publication Data
US 2013/0303751 A1 Nov. 14, 2013

Related U.S. Application Data

(60) Provisional application No. 61/506,497, filed on Jul. 11, 2011, provisional application No. 61/383,846, filed on Sep. 17, 2010.

(51) Int. Cl.
D21B 1/04 (2006.01)
D21B 1/12 (2006.01)
D21B 1/06 (2006.01)
C08H 8/00 (2010.01)
B27K 3/02 (2006.01)
B27K 3/34 (2006.01)

(52) U.S. Cl.
CPC .. *D21B 1/12* (2013.01); *C08H 8/00* (2013.01); *D21B 1/06* (2013.01); *B27K 3/0214* (2013.01); *B27K 3/346* (2013.01)

(58) Field of Classification Search
CPC ........ B27K 3/346; B27K 3/0271; B27K 3/08; C08H 8/00; D21B 1/12; D21B 1/066; D21B 1/04; D21B 1/06; D21H 11/20; D21H 17/03; D21C 9/005; D21C 9/007
USPC ............ 162/9, 21–28, 70–72, 76; 241/20–21, 241/28
See application file for complete search history.

(56) References Cited

U.S. PATENT DOCUMENTS

| | | | | |
|---|---|---|---|---|
| 2,164,416 A * | 7/1939 | Marschall | .......... | 536/73 |
| 2,992,156 A * | 7/1961 | Schulwitz | .......... | 162/157.6 |
| 3,023,140 A * | 2/1962 | Textor | .......... | 162/24 |
| 3,037,902 A * | 6/1962 | Fahey et al. | .......... | 162/157.6 |
| 3,069,309 A * | 12/1962 | Fennell | .......... | 162/26 |
| 3,094,431 A | 6/1963 | Goldstein et al. | | |
| 3,098,785 A * | 7/1963 | Meiler | .......... | 162/11 |
| 3,273,807 A * | 9/1966 | Wright | .......... | 241/42 |
| 3,553,076 A * | 1/1971 | De Haas et al. | .......... | 62/76 |
| 4,012,279 A * | 3/1977 | Selander et al. | .......... | 162/13 |
| 4,187,141 A * | 2/1980 | Ahrel | .......... | 162/23 |
| 4,270,976 A * | 6/1981 | Sandstrom et al. | .......... | 162/26 |
| 4,311,553 A * | 1/1982 | Akerlund et al. | .......... | 162/23 |
| 4,767,499 A * | 8/1988 | Simonson et al. | .......... | 162/25 |
| 4,804,384 A * | 2/1989 | Rowell et al. | .......... | 8/121 |
| 5,036,900 A * | 8/1991 | Burley et al. | .......... | 162/9 |
| 5,129,987 A * | 7/1992 | Joachimides et al. | .......... | 162/25 |
| 5,431,868 A * | 7/1995 | Hirano | .......... | 264/83 |
| 5,525,721 A * | 6/1996 | Ohshima et al. | .......... | 536/69 |
| 5,777,101 A | 7/1998 | Nelson et al. | | |
| 6,376,582 B1 * | 4/2002 | Iwata et al. | .......... | 524/14 |
| 6,632,326 B1 * | 10/2003 | Hirano et al. | .......... | 162/9 |
| 6,723,766 B1 | 4/2004 | Hirano et al. | | |
| 6,835,828 B2 * | 12/2004 | Sears et al. | .......... | 536/69 |
| 7,300,541 B2 * | 11/2007 | Sabourin | .......... | 162/28 |
| 8,216,423 B2 * | 7/2012 | Xu | .......... | 162/25 |
| 2003/0050472 A1 * | 3/2003 | Sears et al. | .......... | 536/66 |
| 2004/0106786 A1 * | 6/2004 | Sears et al. | .......... | 536/66 |
| 2004/0161624 A1 * | 8/2004 | Hwang et al. | .......... | 428/541 |
| 2004/0200586 A1 * | 10/2004 | Herkel | .......... | 162/25 |
| 2004/0258941 A1 | 12/2004 | Neogi et al. | | |
| 2006/0083910 A1 | 4/2006 | Hoglinger et al. | | |
| 2008/0035286 A1 * | 2/2008 | Aichinger et al. | .......... | 162/24 |
| 2008/0066877 A1 * | 3/2008 | Sabourin | .......... | 162/23 |
| 2008/0105391 A1 * | 5/2008 | Sabourin | .......... | 162/18 |
| 2009/0151880 A1 * | 6/2009 | Aichinger et al. | .......... | 162/23 |
| 2010/0186910 A1 * | 7/2010 | Herkel et al. | .......... | 162/26 |
| 2012/0125547 A1 * | 5/2012 | Akai | .......... | 162/9 |
| 2012/0201947 A1 * | 8/2012 | Stuart | .......... | 426/635 |
| 2013/0025920 A1 * | 1/2013 | Shimizu et al. | .......... | 174/258 |
| 2013/0284387 A1 * | 10/2013 | Umemoto et al. | .......... | 162/9 |
| 2013/0303751 A1 * | 11/2013 | Rowell | .......... | 536/120 |
| 2014/0227503 A1 * | 8/2014 | Pol et al. | .......... | 428/220 |
| 2014/0311693 A1 * | 10/2014 | Painter | .......... | 162/76 |

FOREIGN PATENT DOCUMENTS

| | | |
|---|---|---|
| CN | 101502975 A | 8/2009 |
| GB | 742902 A | 1/1956 |
| GB | 2456914 A | 5/2009 |
| GB | 2456915 | 8/2009 |
| RU | 2285698 | 10/2006 |
| WO | 95/23055 A1 | 8/1995 |
| WO | WO 2013051926 A3 * | 4/2013 |

* cited by examiner

OTHER PUBLICATIONS

European Search Report issued from corresponding PCT/US2011/051971, dated Mar. 6, 2014.
Office Action issued for corresponding Canadian Patent Application No. 2,810,920, dated Feb. 18, 2014.
Office Action issued for corresponding Chinese Patent Application No. 201180044908.7, dated Jan. 26, 2014.
English Translation of Office Action issued for corresponding Chinese Patent Application No. 201180044908.7, dated Jan. 26, 2014.

*Primary Examiner* — Jose Fortuna
(74) *Attorney, Agent, or Firm* — Banner & Witcoff, Ltd.

(57) ABSTRACT

A one or two step process for the acetylation and refining of wood pieces in which acetylation and refining to a reduced geometry take place simultaneously in the refiner. Engineered board products comprising acetylated reduced geometry materials possess high dimensional stability and durability compared to like board products comprising non-acetylated materials.

11 Claims, No Drawings

TREATMENT OF WOOD PIECES

RELATED APPLICATION DATA

This application is a National Stage Application under 35 U.S.C. 371 of co-pending PCT application PCT/US2011/051971 designating the United States and filed Sep. 16, 2011; which claims the benefit of Provisional application 61/506,497 and filed Jul. 11, 2011 and Provisional application 61/383,846 and filed Sep. 17, 2010 each of which are hereby incorporated by reference in their entireties.

The present invention relates to the acetylation of wood pieces, and in particular wood chips, in a refiner (defibrator) in which acetylation and refining take place simultaneously.

By the expression "wood pieces" the applicants preferably mean pieces from non-durable wood species such as soft woods, for example, coniferous trees and non-durable hardwoods, namely, spruce, pine or fir, preferably of the order of 8 cms×3 cms×3 cms in size. In the case of wood chips, the corresponding size would be about 2.5 cms×1.5 cms×1.5 cms.

The prior art in this area deals with the acetylation of single wood geometries, e.g. solid wood to acetylated solid wood or wood fibres to acetylated wood fibres. There is no prior teaching relating to acetylating wood while simultaneously changing its geometry. The present invention combines the processes of acetylation and reducing geometry in one or more steps. Since reducing the geometry of wood chips, for example, in a refiner, results in very short residence times in the reducing equipment, a pre-refining step is often carried out according to the present invention to acetylate available hydroxyl groups in the starting geometry. Final acetylation is then carried out in a refiner where additional hydroxyl sites can be acetylated as they become available during geometry reduction. The starting material can be wood pieces of various sizes that are reduced to chips, flakes, strands, particles or fibre in the presence of an acetylation fluid in the refiner. The process can conveniently be executed in one or two steps. In a one step process, wood chips are reduced to a final geometry in the presence of an acetylation fluid in the refiner. In a two step process, the chips are pre-acetylated before reduction to a final geometry as in a one step process.

Depending on the final desired geometry and degree of acetylation, wood geometries may be pre-acetylated or post-acetylated with respect to acetylation in a refiner. Such pre or post treatments may be conveniently carried out by impregnating the wood geometries with hot acetylation fluid in a reaction vessel.

Thus, the present invention provides a process for the acetylation of wood pieces in a refiner in which pieces having a moisture content of 2%-10% are introduced into the refiner in the presence of an acetylation fluid at a temperature in the range of 120-170 C and refined for a period of 0.5-60 minutes to pieces of a reduced geometry having an acetylated weight percent gain of 10-30%.

Preferably, the wood pieces have a moisture content of 2%-5%, and desirably, the acetylation fluid is at a temperature in the range of 140-170 C. Also, preferably, the wood pieces are refined for a period of 1-60 minutes.

In one embodiment the wood pieces are acetylated prior to their introduction into the refiner. In such processes the acetylation fluid prior to and in the refiner may be pressurised up to 6 bar.

Additionally or alternatively the acetylated wood pieces of a reduced geometry may be further acetylated and refined.

In a one step process, dried chip and acetylation fluid are introduced into a refiner and reacted and refined at the same time. However, since such a process provides only a very short residence time in which acetylation can take place, a two step process may be appropriate in which the dried chip is first pre-acetylated by contacting with acetylation fluid in a reaction vessel before it is conveyed to the refiner where it is simultaneously further acetylated and refined to fibre in the presence of the acetylation fluid.

In either the one or two step process, once the final desired level of acetylation is reached, any residual fluids are preferably removed using a hot gas or water washing, and the resulting wood geometry is preferably dried.

The present invention also envisages multi-step processes where wood geometry may be changed a number of times before a final geometry is reached. High levels of acetylation may be obtained in such cases.

It is, therefore, possible to start with large pieces of wood and reduce their geometry in the presence of a hot acetylation fluid, such as acetic anhydride, in a refiner. Acetylated strand, chip, flake, fibre, particle or flour geometries are possible as a result of using this invention, such materials being of potential value in the manufacture of engineered board products having improved dimensional stability and decay resistance when compared with board products comprising non-acetylated materials.

A mixture of acetic anhydride and acetic acid may be used in place of acetic anhydride alone, typically in the range of anhydride 95%, acid 5% to anhydride 55%, acid 45%.

The following examples serve to illustrate but not limit the present invention.

EXAMPLE 1

Southern yellow pine chip (2 cms×1 cm×1 cm) was dried to a moisture content of 2%-10% and placed in an atmospheric Asplund defibrator D connected to a 20 hp Baldor industrial motor. Acetic anhydride was introduced into the defibrator along with the chip and the temperature raised to 140° C. The gap between the defibrator blades and the containing wall was 0.7 mm. The door was sealed and the defibrator held at 140° C., and run at 1700 rpm for different periods of time. Excess anhydride and by-product acetic acid was removed, and the acetylated fibre washed with water and dried in an oven at 150° C. Equilibrium moisture content (EMC) at 90% relative humidity (RH) and 27° C., acetyl weight gain and visual fibre size distribution were determined on the isolated acetylated fibre.

The weight percent gain (WPG) resulting from acetylation in the defibrator is shown in Table 1. However, Table 2 shows that due to the relatively long contact time between chip and defibrator blades during the acetylation reaction, the resulting fibres can be rather short. If they are considered too short for their intended end use, then a pre-acetylation step may first be carried out, as described below.

TABLE 1

Weight percent gain of acetylated southern yellow pine fibre at different times
Weight percent gain at: (minutes)

| 15 | 30 | 45 | 60 |
|---|---|---|---|
| 15.6% | 17.2% | 20.2% | 21.6% |

TABLE 2

Equilibrium moisture content and visual fibre size distribution after refining acetylated chip

| WPG | EMC (90% RH, 27 □ C.)% | LF/SF |
|---|---|---|
| 20.2% | 3.6 | 5/95 |
| 21.6% | 3.3 | 2/98 |

LF = long fibre,
SF = short fibre or dust

EXAMPLE 2

Southern yellow pine chip (2 cms×1 cm×1 cm) was dried to a moisture content of 2%-10% and placed in a reaction vessel at atmospheric pressure connected to a Sprout-Bauer double disc refiner. Acetic anhydride was introduced into the reaction vessel and the temperature raised to 140° C. for different periods of time. The acetylation reaction was continued until the desired level of acetylation was achieved, e.g. 8%-12% wpg. The acetylated chip and reaction mixture was then conveyed to the refiner and the acetylated chip refined. Excess anhydride and by-product acetic acid were removed, e.g. using a hot gas or water washing. Equilibrium moisture content at 90% relative humidity (RH) and 27° C., acetyl weight gain and visual fibre size distribution were determined on the isolated acetylated fibre.

Table 3 shows the data from the two step process. The chip was first acetylated to different weight percent gains and then transferred to the refiner along with the hot reaction media. After a reaction time of 60 minutes the acetylated fibre had a WPG of 20.1%, an EMC of 4.9% and consisted mainly of long fibre

TABLE 3

Weight percent gain equilibrium moisture content and visual fibre size distribution after refining acetylated chip.

| Reaction Time (mins) | WPG | EMC (90% RH, 27 C.) | LF/SF |
|---|---|---|---|
| 15 | 13.2 | 11.2% | 80/20 |
| 30 | 16.6 | 8.3% | 75/25 |
| 45 | 18.9 | 6.3% | 70/30 |
| 60 | 20.1 | 4.9% | 60/40 |

LF = long fibre,
SF = short fibre or dust

Table 4 shows the correlation between EMC and dimensional stability (anti-shrink efficiency ASE), and weight loss after a 12 week ASTM standard soil block test with both brown-and-white-rot fungi. This data indicates that if the final EMC of the acetylated fibre is below about 7.5, then engineered board products, such as medium density fibreboard, made using the fibre will have high dimensional stability, and will be resistant to attack by brown-rot and white-rot fungi.

TABLE 4

Correlation between EMC, dimensional stability and decay resistance of fibreboard made from control and acetylated southern yellow pine fibre.

| WPG % | EMC % | ASE | Weight loss (%) Brown-rot fungus | Weight loss (%) White-rot fungus |
|---|---|---|---|---|
| 0 | 17.7 | — | 61.3 | 7.8 |
| 12.3 | 10.8 | 61.9 | 6.7 | 2.6 |
| 15.8 | 8.9 | 77.1 | 3.4 | <2 |
| 17.1 | 7.3 | 84.8 | <2 | <2 |
| 20.8 | 3.8 | 94.7 | <2 | <2 |

EMC at 90% RH 27 □ C.,
ASE = anti-shrink efficiency,
12 week soil block ASTM D 2017-71
test - Brown-rot fungus = *Gloephyllum trabeum*, White-rot fungus = *Trametes versicolor*

A variation of this method could be a three step process where a further reaction step is added after refining. Both the two step and three step processes would preferably be conducted in a continuous manner where the reactors and refiner were connected and different wood geometries conveyed by means of a plug screw or the like

EXAMPLE 3

Spruce chips with approximate dimensions 2.0 cms×1.0 cm×0.5 cm were kiln dried to a moisture content of 2-5%. The dried chips were loaded into an impregnation vessel which was depressurized to about 0.2 bar. Next, a mixture of 10% acetic acid and 90% acetic anhydride at ambient temperature was administered to the point that all chips were submerged. Nitrogen gas was used to increase the pressure to 1 bar. Then, the liquid was mostly drained off and the chips with a small amount of excess acetylation fluid were fed to a refiner. The refiner was isolated by means of a jacket which was heated with oil to control the temperature inside. The heat inside the refiner was used to increase the temperature of the chips to 135° C. After 0.5 minutes the refined material was collected after the refiner in an insulated collection vessel from which the material was transported to a dryer by means of a screw conveyor. Nitrogen gas at a temperature of 150° C. was fed to the collection vessel and the dryer feed screw to reduce the acetic anhydride and/or acetic acid vapours coming of the refined material. The acetylated and dried material was collected after the drying process. The acetyl weight gain was 13.5%-17.5%

EXAMPLE 4

Spruce chips with approximate dimensions 2.0 cms×1.0 cm×0.5 cm were kiln dried to a moisture content of 2-5%. The dried chips were loaded into an impregnation vessel after which the pressure was decreased to 0.2 bar. Then, a preheated mixture of 10% acetic acid and 90% acetic anhydride at a temperature of 130° C. was added to the chips to the point that they were submerged. Nitrogen gas was added to further increase the pressure to 1 bar. The liquid was then mostly drained off and the chips with a small amount of excess acetylation fluid were fed to a refiner together with nitrogen gas at atmospheric pressure. The temperature inside was regulated at 135° C. The refiner components were isolated by means of a jacket which was heated with oil to maintain the desired temperature inside. After 0.5 minutes the refined material was collected after the refiner in a collection vessel from which the material was transported to a dryer by means of a screw conveyor. An inert gas at a temperature of 150° C. was fed to the collection vessel and the dryer feed screw to reduce the acetic anhydride and/or acetic acid vapours coming of the refined material. The acetylated and dried material was collected after the drying process. The acetyl weight gain was 17.5%-22%

EXAMPLE 5

Spruce chips with approximate dimensions 2.0 cms×1.0 cm×0.5 cm were kiln dried to a moisture content of 2-5%. The dried chips were loaded into an impregnation vessel after which the pressure was decreased to 0.2 bar. Then, a pre-heated mixture of 10% acetic acid and 90% acetic anhydride at a temperature of 130° C. was added to the chips. Nitrogen gas was added to further increase the pressure to 2 bar. The liquid was then mostly drained off under pressure and the chips with a small amount of excess acetylation fluid were fed to a refiner. Nitrogen gas was applied to the refiner to maintain the pressure at 2 bar. The temperature inside was maintained at 150° C. The refiner components were isolated by means of a jacket which was heated with oil to maintain the desired temperature inside. After 0.5 minutes the refined material was collected after the refiner in an insulated collection vessel from which the material was transported to a dryer by means of a screw conveyor. An inert gas at a temperature of 150° C. was fed to the collection vessel and the dryer feed screw to reduce the acetic anhydride and/or acetic acid vapours coming off the refined material. The acetylated and dried material was collected after the drying process. The acetyl weight gain obtained was 22%-25%

EXAMPLE 6

Spruce chips with approximate dimensions 2.0 cm×1.0 cm×0.5 cm were kiln dried to a moisture content of 2-5%. The dried chips were loaded into an impregnation vessel after which the pressure was decreased to 0.2 bar. Then, a pre-heated mixture of 10% acetic acid and 90% acetic anhydride at a temperature of 130° C. was added to chips. Nitrogen gas was added to further increase the pressure to 3 bar. The liquid was then mostly drained off and the chips with a small amount of excess acetylation fluid were fed to a refiner. Nitrogen gas was applied to the refiner to maintain the pressure at 3 bar. The temperature inside was maintained at 160° C.

The refiner components were isolated by means of a jacket which was heated with oil to maintain the desired temperature inside the refiner. After 0.5 minutes the refined material was collected after the refiner in an isolated collection vessel from which the material was transported to a dryer by means of screw conveyor. Nitrogen gas at a temperature of 150° C. was fed to the collection vessel and the dryer feed screw to reduce the acetic anhydride and/or acetic acid vapours coming off the refined material. The acetylated and dried material was collected after the drying process. The acetyl weight gain was 25%-28%.

EXAMPLE 7

Spruce chips with approximate dimensions 2.0 cm×1.0 cm×0.5 cm were kiln dried to a moisture content of 2-5%. The dried chips were loaded into an impregnation vessel after which the pressure was decreased to 0.2 bar. Then, a pre-heated mixture of 10% acetic acid and 90% acetic anhydride at a temperature of 130° C. was added to chips. Nitrogen gas was added to further increase the pressure to 6 bar. The liquid was then mostly drained off and the chips with a small amount of excess acetylation fluid were fed to a refiner. Nitrogen gas was applied to the refiner to maintain the pressure at 6 bar. The temperature instead was maintained at 170° C. The refiner components were isolated by means of a jacket which was heated with oil to maintain the desired temperature inside the refiner. After 0.5 minutes the refined material was collected after the refiner in an isolated collection vessel from which the material was transported to a dryer by means of a screw conveyor. Nitrogen gas at a temperature of 150° C. was fed to the collection vessel and the dryer feed screw to reduce the acetic anhydride and/or acetic acid vapours coming off the refined material. The acetylated and dried material was collected after the drying process. The acetyl weight gain was 28%-30%.

Engineered board products, e.g. medium density fibreboard, comprising fibre acetylated according to examples 3-7 possessed high dimensional stability and durability compared to like board comprising non-acetylated fibre.

The invention claimed is:

1. A process for the acetylation of wood pieces in a refiner comprising:
    adding wood pieces having a moisture content of 2% to 10% and an acetylation fluid at a temperature range between 120° C. to 170° C. into the refiner; and,
    refining the wood pieces in the presence of the acetylation fluid for a period of 0.5-60 minutes to form pieces of a reduced geometry having an acetylated weight percent gain of 10% to 30%.

2. The process of claim 1 in which the moisture content of the wood pieces is 2%-5%.

3. The process of claim 1 in which the acetylation fluid is at a temperature in the range of 140 C to 170 C.

4. The process of claim 1 in which the wood pieces are refined for a period of 1-60 minutes.

5. The process of claim 1 in which the wood pieces are pre-acetylated in a reaction vessel prior to their introduction into the refiner.

6. The process of claim 1 in which the acetylation fluid is pressurised up to 6 bar.

7. The process of claim 1 in which the acetylated wood pieces of reduced geometry are further acetylated and refined.

8. The process of claim 1 in which the wood pieces comprise chips and the wood pieces of a reduced geometry comprise fibres.

9. The process of claim 1 in which the acetylation fluid comprises acetic anhydride.

10. The process of claim 1 in which the acetylation fluid comprises a mixture of acetic anhydride and acetic acid.

11. The process of claim 10 in which the mixture of acetic anhydride and acetic acid is in the ratio of 90% anhydride to 10% acid by weight.

* * * * *